(No Model.) 3 Sheets—Sheet 1.

L. B. WHITE.
PLOW.

No. 260,072. Patented June 27, 1882.

Witnesses:
Saml R. Turner
M. M. Lacey

Inventor
Lewis B. White
By R. S. & A. P. Lacey
Atty's

N. PETERS, Photo-Lithographer, Washington, D. C.

(No Model.) 3 Sheets—Sheet 2.
L. B. WHITE.
PLOW.
No. 260,072. Patented June 27, 1882.
FIG. 5. FIG. 6.
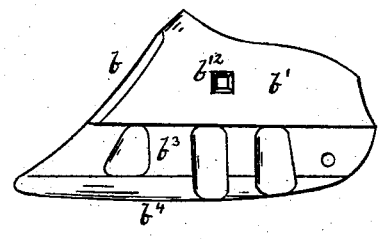
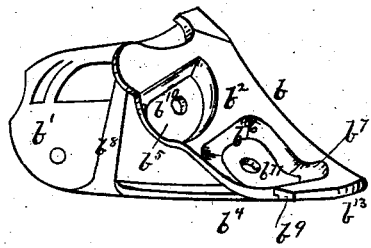
FIG. 9. FIG. 7. FIG. 8.
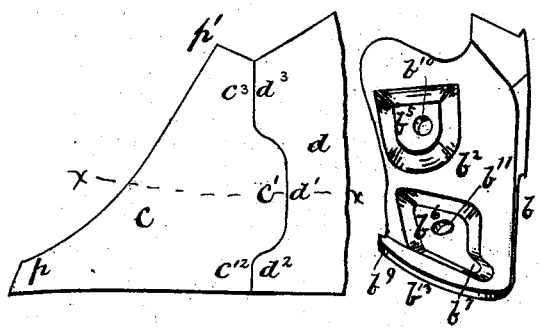
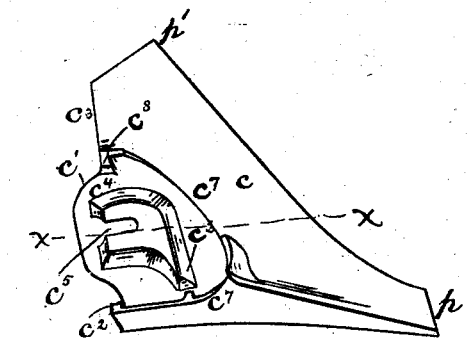
FIG. 10.
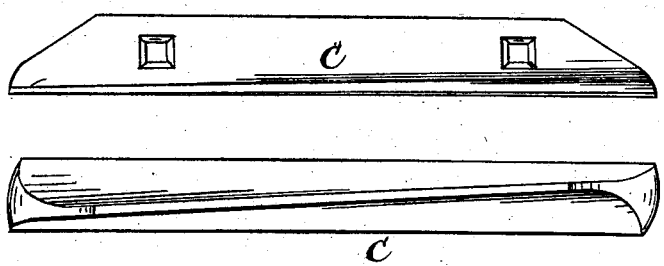
FIG. 11.
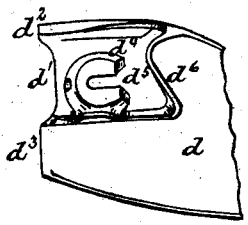
Witnesses: Inventor:
Sam'l R. Turner Lewis B. White
M. M. Lacey By R. S. & A. P. Lacey
Att'y's
N. PETERS. Photo-Lithographer, Washington, D. C.

(No Model.)  3 Sheets—Sheet 3.

L. B. WHITE.
PLOW.

No. 260,072. Patented June 27, 1882.

WITNESSES
J. E. Clark.
A. Parker

INVENTOR
Lewis B. White
By R. S. & A. P. Lacey
Attorney

UNITED STATES PATENT OFFICE.

LEWIS B. WHITE, OF NORFOLK, VIRGINIA.

PLOW.

SPECIFICATION forming part of Letters Patent No. 260,072, dated June 27, 1882.

Application filed March 22, 1880. (No model.)

*To all whom it may concern:*

Be it known that I, LEWIS B. WHITE, a citizen of the United States, and a resident at Norfolk, in the county of Norfolk and State of Virginia, have invented certain new and useful Improvements in Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of plows shown in Patents Nos. 129,076, 140,749, 164,951, and 164,952, granted to me; and it consists in certain improvements which will be hereinafter explained, and pointed out in the claims.

Figure 1:
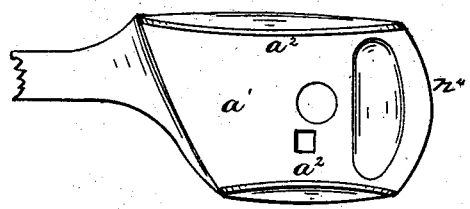
Figure 2:
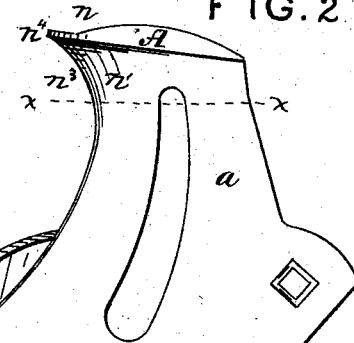
Figures 3, 4:
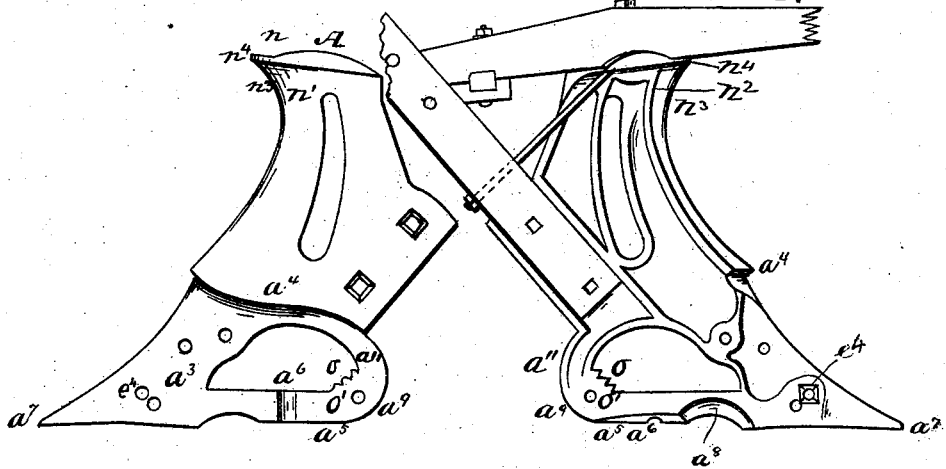
Figure 12:
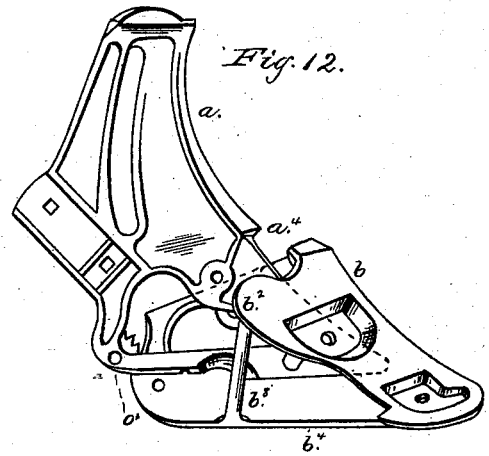
Figure 13:
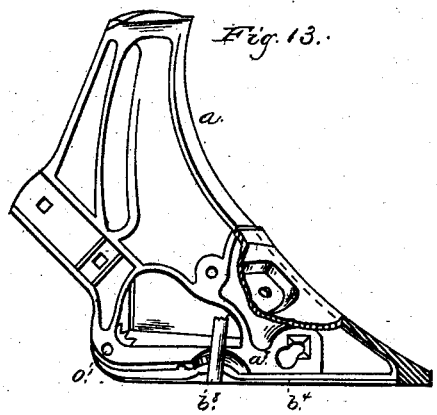
Figure 14:
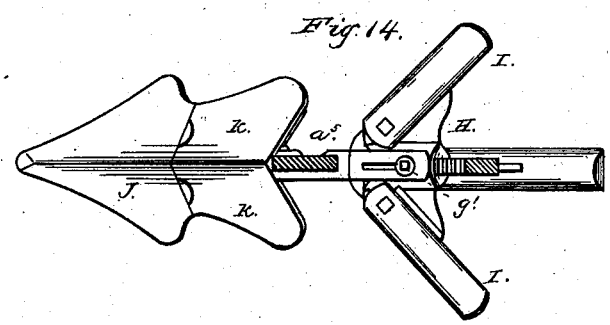
Figure 15:
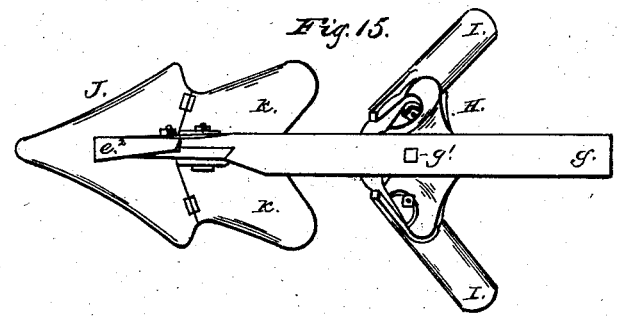

In the drawings, Figure 1 is a top view of the standard. Fig. 2 is a side elevation of a plow constructed according to my invention. Figs. 3 and 4 are elevations from opposite sides of the standard with the foot and mold-board removed. Figs. 5, 6, and 7 are views of the removable foot which slips onto the lower end of the standard. Fig. 8 is an under side view, and Fig. 9 is a plan of the share of a single mold-board plow. Fig. 10 is the landside. Fig. 11 shows the under or rear sides of a portion of the mold-board. Figs. 12 and 13 are detail views, showing the movement of putting the removable foot onto the standard. Figs. 14 and 15 show the parts of a double-turn plow applicable to my improved standard, the said parts being similar to those shown in my Patent No. 164,951.

$a$ is the standard, the upper end of which is enlarged, so as to provide a head, $n$, which projects forward and laterally a wide and long upper surface, $a'$, made slightly convex longitudinally, for holding the plow-beam. The standard, near its upper end, is gradually thickened in outwardly-curved lines, so as to provide vertical concave surfaces $n'$ $n'$ on opposite sides, and the vertical concave edge $n^2$ on its front. It is also built up so that it is convex in horizontal line $x$ $x$, Fig. 2. The head is finished to a thin convex edge or rim, $n^4$, on its forward end, which rim or edge is continued backward along the plow-beam, and formed thereon the vertical side flanges, $a^2$, which extend upward on opposite sides of said beam. The standard-head $n$ is not made in separate pieces from the standard, but is an extension of the latter into the form described. The object in this formation of the head $n$ is to prevent clogging. It is well known that very slight angular surfaces on the upper end of plow-standards are sufficient to prevent the ready throwing off of long grass, cornstalks, or other trash, while curved surfaces permit said trash to pass readily.

The standard $a$ is constructed with a head, $n$, of peculiar form and adaptation. The head is formed by enlarging the upper end of the standard so that it projects forward and laterally in both sides. This enlargement is made by gradually building the upper end outward and forward in curved lines, thus providing a concave front edge, $n^3$, surfaces $n'$ $n^2$, and lateral concave $f$, which gives to any trash that may be forced upward to the beam an outward impetus or throw and prevents it from lodging against the beam and clogging the plow. The concave lateral surfaces $n'$ $n^2$ are also made convex in horizontal section.

The flanges $a^2$ are made convex on their inner faces from their front to their rear ends. This construction of the flanges $a^2$ and surface $a'$ permits a lateral and vertical pivotal adjusting movement of the beam, and at the same time maintains a constant and firm hold thereon, which prevents any lateral or sliding movement thereof and takes off the bolt which unites standard to beam.

The standard $a$ has its lower wing or end, $a^3$, formed thinner than the upper end, so as to provide a shoulder, $a^4$, on the landside, and arranged about midway between its upper and lower ends, the said shoulder being so formed as to extend from the rear edge to and across the front edge thereof, as shown. The shoulder is by preference made slightly concave in its length across the side of the standard, forming a smooth joint. A foot, $a^3$, of the standard is formed with a rear projecting arm or base, $a^5$, the under edge of which is in the same horizontal line with the point $a^7$. The rear end of the base $a^5$ is united to the body of the standard by a rear extended arch-base, $a^{10}$, and on the inner side, at the point of union between the base $a^5$ and arch-base $a^{10}$, there is formed a series of teeth, $o$, as shown. Through the rear end of the base $a^5$ there is formed a hole, $o'$, in which the bolt is put which fastens the rear end of the wing of the removable foot. This construction provides facilities for holding the removable foot and for converting the plow from a single to a double mold-board plow by attaching the under stock and blades, the double mold-board and share shown in my patent No. 164,951.

On the land side of the base $a^5$ there is formed the vertical half-round mortise $a^6$, for purposes hereinafter explained.

The standard has formed in its under edge a curved side recess or mortise, $a^8$, which fits over the cross-brace of the removable foot, hereinafter described.

$b$ is the double-winged removable foot, composed of the landside-wing $b'$ and the mold-board wing $b^2$. It fits snugly on the lower end, $a^3$, of the standard $a$, to which it is secured by a suitable bolt through its landside-wing $b'$. The upper edge of the landside-wing $b'$ is jointed to and fits snugly against the shoulder $a^4$, while the lower portion, $b^3$, of its outer face is let in sufficiently to form a seat for the removable landside C. The landside-wing $b'$ has a flange, $b^4$, formed on its under edge, which is curved upward, as shown, and at its forward end unites with the under edge of the mold-board or wing $b^2$ and forms a neat and strong socket for the reception of the point $a^7$ of the standard $a$. The flange $b^4$ acts as a brace and prevents the foot from being broken.

The rear ends of the wings $b'$ $b^2$ are supported by the cross-brace $b^8$, which is so arranged as to pass under the base $a^5$ of the standard when the latter and the removable foot are fastened together. The brace $b^8$ has one end fixed in the flange $b^4$ on the under edge of the wing $b'$, while its opposite end abuts against the inner side of the rear end of the wing $b^2$.

When the standard $a$, removable foot $b$, and landside C are fastened together they present a smooth vertical side for the single or the turning plow, as shown in Fig. 2.

On the upper or front side of the mold-board or wing $b^2$ of the removable foot $b$ are formed two recesses, $b^5$ $b^6$, which are adapted to receive correspondingly-shaped projections formed on the under side of the mold-board and on the under side of the share or point, hereinafter described. The socket $b^6$ is lengthened on its lower side, forming the extension $b^7$, as shown. The foot has also a small lip or projection, $b^9$, formed on the outer lower corner, as shown.

$b^{10}$ $b^{11}$ $b^{12}$ are bolt-holes arranged as shown.

$c$ is the share, having formed on its upper edge the projection $c'$, which is so arranged as to provide straight shoulders $c^2$ $c^3$ on each side of it.

On the under side of the projection $c'$ there is formed a projection, $c^4$, which fits snugly into the depression or socket $b^6$ on the foot $b$, and it is provided with a T-shaped slot, $c^5$, which receives the head of the bolt which retains the said share in place on the said casting. $c^6$ is a rib or extension of the projection $c^4$, formed and arranged to fit snugly in the extension $b^7$ of the socket $b^6$.

$c^7$ is a flange formed in such manner as to fit snugly around the point of the foot $b$ when the share is fixed thereon. The flange is formed with the hooked end $c^8$, which passes behind or back of the projecting end $b^9$.

It will be seen that the share, seated on the casting, as described, will be held from twisting or turning by means of the coaction of the several parts hereinbefore described. The small bolt put through the hole $b^{11}$, and having its head slipped into the slot $c^5$, holds the share from being lifted vertically off its seat.

When the share is attached to the foot the curved edge or rim $b^{13}$ of the latter extends well down under and strengthens the frame at its weakest points.

I am enabled to make my shares much lighter than shares have ordinarily been made, because of the support which is given by the rim $b^{13}$, and the seat which is formed for the foot by flange $c^7$ gives to the share great firmness in its position.

$d$ is the mold-board. Its forward end has formed in it the recess $d'$, which, with shoulders $d^2$ $d^3$, adapts it to fit snugly over the projection $c'$ and against the shoulders $c^2$ $c^3$ on the share $c$. On the under side of the mold-board there is formed a projection, $d^4$, which fits snugly into the recess $b^5$ in the wing $b^2$ of the foot $b$.

$d^5$ is a T-shaped slot, formed in the projection $d^4$ to receive the head of the bolt which passes through the hole $b^{10}$ and holds the mold-board to the foot. The projection $d^4$ is surrounded by a flange, $d^6$, the edge of which rests on the casting $b$ and prevents dirt from getting into the slot $d^5$. This flange $d^6$ also supports and gives the proper "set" to the mold-board and point. This flange is made of different depths on different mold-boards, so that the same foot $b$ may be employed to hold any one of them, and thus form a plow of greater or less inclination of mold-board. The share would have to be formed on its upper edge to adapt it to the set given to the mold-board.

C is the landside described in my Patent No. 140,749. It fits into the recess or half-mortise $b^3$ on the side of the foot $b$, where it is held by suitable bolts.

In a single turn-plow constructed as hereinbefore explained the several parts liable to wear or to be broken are made in separate pieces, so that in case of accident to any given part it may be replaced without much cost or trouble. The mold-board and share present a continuously-smooth surface free from bolt-holes. The share and mold-board are so braced together by their peculiar adaptation one to the other that any swinging or twisting of the mold-board on its single bolt is entirely prevented. All the parts of the plow are held as firmly as though formed together in a single casting.

The base $a^5$ is made much thinner than in my Patent No. 129,076, in order that it may readily be adapted to both single and double mold-board plows, and it has the half-round vertical mortise $a^6$, corresponding to a half-round mortise in the sole, hereinafter described.

The weeder-stock H and its blades I and the double mold-boards K K are constructed and applied to the standard, substantially as in my Patents Nos. 129,076 and 164,951.

The standard may readily have applied to it the several parts forming a single turn-plow, as shown in Fig. 2; or it may have the parts of the double turn-plow applied as readily thereto, as shown in Figs. 14 and 15. Should any one part be broken it can be replaced by another at small cost. Should the leg or standard be broken a new one can be supplied at little cost without involving the loss of the foot $b$ or any of the other parts. It will be seen that either the share or the mold-board may be removed from the foot without removing the other. Each is held independently by its own fastenings. Their edges are jointed together, and when both are secured to the foot they are held rigidly together and to the standard. The center of the rear edge of the share, being built up so as to form the lug or projection $c'$, enables me to furnish a share containing less metal than the ordinary share, and at the same time furnishes all the necessary facilities for making a strong connection with the foot. The projection $c^4$ is formed partially or wholly on the under side of the extension $c'$, and the latter covers the socket $b^6$, thereby excluding dirt from its own bolt-fastening.

In Figs. 12 and 13 the motion of slipping the shoe onto the standard is illustrated. When the two parts are brought together the under inner flange, $b^4$, of the foot projects under and protects the under edge of the standard $a$.

It will be further seen that the bearing provided by the flange $d^6$, Fig. 11, may be provided by a series of projecting points answering as bearings and arranged around the bolt-fastening. The protection of the bolt from dirt or dampness is but a secondary consideration, secured by making the flange or bearing $d^6$ continuous, as shown.

In the construction of the share and standard-foot I have shown the lug or projection for holding the bolt-head as formed on the under side of and covered by the rear part of said share; but it will be readily understood that a share having a rear projecting lug, as shown in Patent No. 164,951, issued to me, may be employed. In this case the extension $c'$ of the share could be dispensed with and the socket $b^6$ would be arranged accordingly. The mold-board would be closely jointed to the share, and would cover the bolt-head which secured the share. The projecting lug would fit into the socket and the share would be secured by the bolt passed through the bolt-hole $b^{11}$.

Having described my invention, what I claim, and desire to secure by Letters Patent, is—

1. In a plow, the improved standard or stem $a$, having its lower end, $a^3$, reduced on its outer side to provide a shoulder, $a^4$, and having the rear extended base $a^5$, the rear arch-brace, $a^{11}$, and suitable bolt-holes, all arranged and adapted to be used either for a single or a double turn-plow, substantially as set forth.

2. The combination, with the foot $b$, having the socket $b^6$ in its wing $b^2$, of the share $c$, having the projection $c^4$, T-slot $c^5$, and the rib or flange $c^6$, substantially as set forth.

3. The combination, with the foot $b$, constructed with the recesses $b^6$ $b^5$ and projection $b^9$, of the share $c$, having the projection $c^4$ and T-slot $c^5$, and provided with the flange $c^7$, having hooked end $c^8$, substantially as set forth.

4. The combination, with the foot $b$, constructed with the recess $b^5$, of the mold-board $d$, abutted against the share $c$, and having the projection $d^4$ and T-slot $d^5$, substantially as set forth.

5. The double-winged casting or foot $b$, composed of the landside-wing $b'$, having mortise $b^3$ on its outer side to receive the landside $c$, and the mold-board wing $b^2$, furnished with recesses or sockets $b^5$ $b^6$, substantially as and for the purposes as set forth.

6. In a standard for plows, the improved foot $b$, formed of the landside-wing $b'$, having the inner under flange, $b^4$, and the outer side mortise, $b^3$, to receive the landside C and the mold-board wing $b^2$, and cross-brace $b^3$, substantially as set forth.

7. In a plow, the herein-described means for securing the mold-board, consisting in a socket, $b^5$, on the standard-foot and the mold-board $d$, having on its under side a slotted projection, $d^4$, to receive the bolt-head, and adapted to fit in the socket $b^5$, and there be bolted to the foot, covering the socket and the bolt-head, substantially as and for the purposes set forth.

8. In a plow, the herein-described means for securing the share, consisting of the foot $b$, having the socket $b^6$, and the share $c$, having a projection, $c^4$, to fit in the socket $b^6$ in the standard-foot, and having the slot $c^5$, the share covering the bolt-head, as set forth.

9. In a plow-standard, a removable foot constructed with a longitudinal side recess or seat, $b^3$, to receive the landside C, and a wearing-surface between the said seat and the upper edge of said foot, substantially as shown.

10. In a plow, the standard $a$, provided with an abutting shoulder, $a^4$, on its landside, and shaped to fit in the removable foot $b$, and provided with a base or support, $a^5$, extended to the rear and adapted for either a single mold-board plow or for the sweeps and double mold-board of a cultivating-plow, substantially as set forth.

11. The combination of the removable foot $b$, having wings $b'$ $b^2$, brace $b^3$, having one end made fast to the wing $b'$, near the lower edge of the latter, and its other end inclined upward and extended to and made fast to wing $b^2$, and the stem $a$, having its lower end formed to slide into the angle between the wings $b'$ $b^2$, the said brace $b^3$ being arranged to permit the easy insertion or removal of the stem $a$, as shown in Figs. 14 and 15, substantially as set forth.

In testimony that I claim the foregoing I have hereunto set my hand.

LEWIS B. WHITE.

Witnesses:
PERRY B. TURPIN,
GEO. F. GRAHAM.